March 13, 1956 P. GARNER 2,737,766
DISC HARROWS
Filed Dec. 4, 1953 2 Sheets-Sheet 1

INVENTOR
PAUL GARNER
BY Terry and Cohn
ATTORNEYS.

March 13, 1956    P. GARNER    2,737,766
DISC HARROWS
Filed Dec. 4, 1953    2 Sheets-Sheet 2
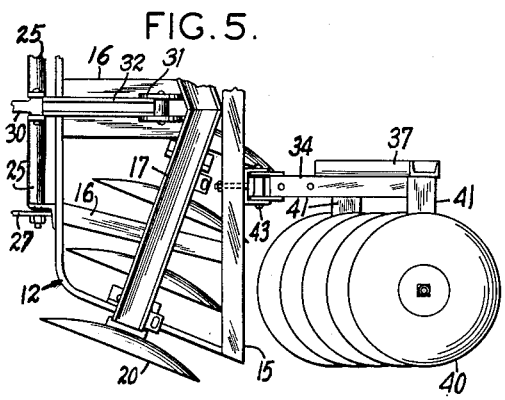
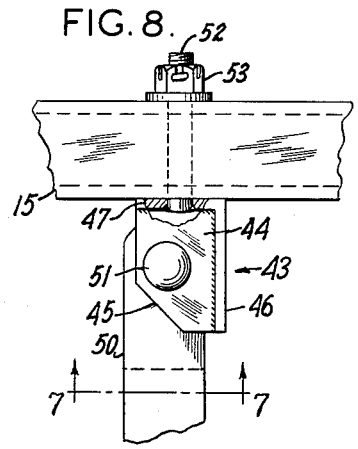
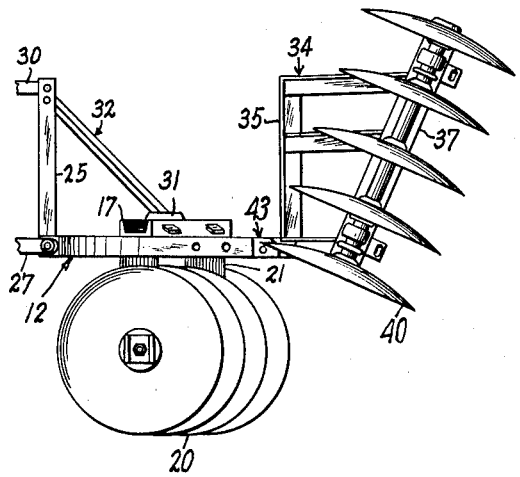
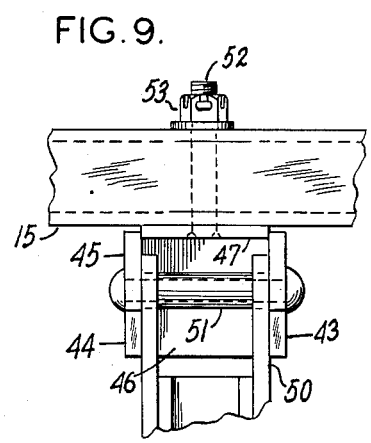
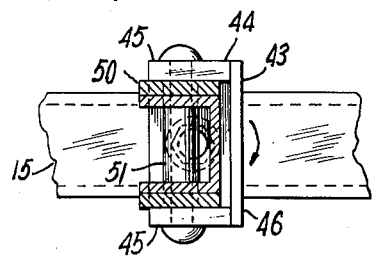
INVENTOR.
PAUL GARNER
BY
Terry and Cohn
ATTORNEYS.

United States Patent Office
2,737,766
Patented Mar. 13, 1956

2,737,766

DISC HARROWS

Paul Garner, Picayune, Miss.

Application December 4, 1953, Serial No. 396,173

7 Claims. (Cl. 55—83)

This invention relates to improvements in disc harrows, and has special reference to a harrow wherein the discs are arranged in front and rear gang sections which are connected together in an improved manner that greatly enhances the usefulness of this type of farm implement.

An object of the present invention resides in the provision of an improved tandem disc harrow which is adapted to be used for tilling and breaking up the soil in the customary manner, that is, with both front and rear gangs in operation, and is also useful for heavy or so-called bush and bog discing wherein the rear gang is not used for discing, but its weight is added to that of the front gang so as to effect deep penetration of the soil. Disc harrows of the type described are known and in general use, these being sometimes referred to as "fold-over" harrows because of the provisions for hinging or folding the rear gangs over and upon the front gangs when converting from conventional to "bush and bog" arrangement of the gangs.

The present invention is chiefly directed to improved provisions, in such harrows, by which the rear gang or gangs are adjustably and pivotally connected to the forward gang or gangs. These provisions make it relatively easy for a man of average strength to lift and swing the rear gang sections from the tandem to the superimposed positions, an operation which cannot be readily performed by a single person with the prevailing fold-over harrows.

Another important advantage achieved by the present invention is the provisions for effecting angular adjustments of the rear gang sections so as to regulate the depth with which those sections penetrate the soil.

The foregoing and numerous other objects and advantages of the invention will more clearly appear from the following detailed description of a presently preferred embodiment, particularly when considered in connection with the accompanying drawings, in which:

Fig. 5 is a fragmentary top plan view of the harrow of Fig. 1, showing an auxiliary gang section raised out of coplanar relation with the main gang section, and located in an intermediate position between the tandem and folded positions shown respectively in Figs. 1 and 3;

Fig. 6 is a side elevational view of the harrow as shown in Fig. 5;

Fig. 7 is a fragmentary, enlarged view of the hinge and pivot connections shown in cross section as taken along line 7—7 of Fig. 1 or of Fig. 8;

Fig. 8 is a fragmentary top plan view of the hinge and pivot connections shown in Fig. 7, the hinge being disposed in the position shown in Figs. 1 and 2, and Fig. 9 is a fragmentary top plan view of the hinge and pivot connections of Fig. 8, showing the hinge elements disposed in the position shown in Figs. 5 and 6.

Figure 1:
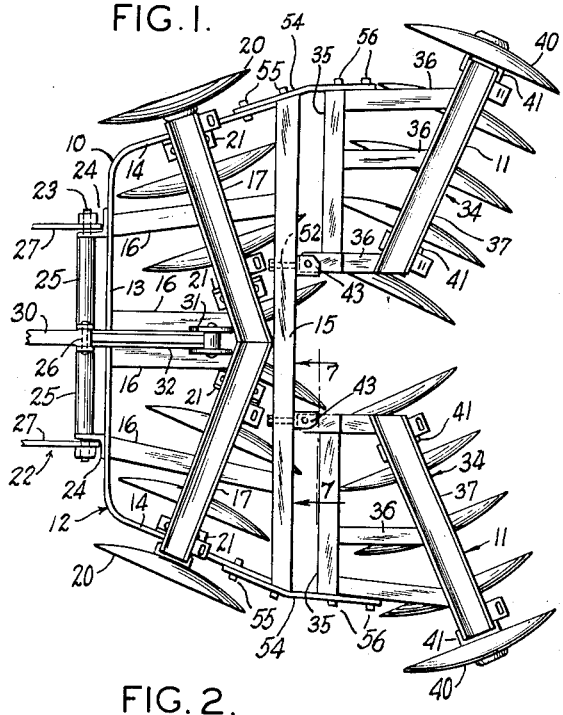
Fig. 1 is a top plan view of the sectionalized disc harrow showing the auxiliary sections in an extended coplanar relation with the main gang section.
Figure 2:
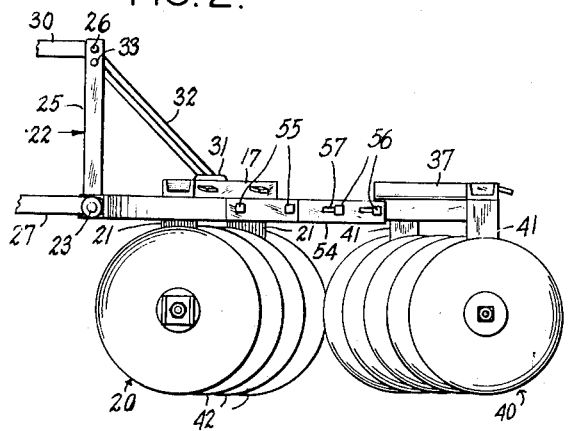
Fig. 2 is a side elevational view of the harrow shown in Fig. 1.

Referring now by characters of reference to the drawings, and first to Fig. 1, it will be noted that the disc harrow consists of a main gang section generally indicated at 10, and a pair of auxiliary gang sections generally referred to at 11. In Figs. 1 and 2, the auxiliary gang sections 11 are shown disposed tandem-wise behind main gang section 10, which are in the normal operating positions of the sections.

The main gang section 10 consists of a front frame, referred to at 12, of substantially U-shaped configuration, as shown in Fig. 1, having a front margin 13 and opposite side margins 14. Attached to the rearmost ends of each side margin 14 is a straight angle strip 15 located transversely of frame 12, the angle strip 15 constituting the rear margin of the frame. A plurality of braces 16 are bridgingly located between and secured to front margin 13 and rear margin 15.

A pair of channel members 17 are located on top of and fastened to braces 16 and side margins 14 of frame 12. The innermost ends of channel members 17 are located at the rear of center braces 16 and adjacent rear margin 15, and are extended forwardly and outwardly at an angle from the transverse rear margin 15 to provide a substantially V-shaped trough. As more clearly shown in Figs. 1 and 2, a gang of harrowing discs, generally indicated at 20, is secured to and dependingly carried on the channel members 17 by vertical straps 21. Obviously, each of gangs 20 is dependingly carried below front frame 12. The disc gangs 20 are oppositely arranged, and are extended forwardly from the center of frame 12 to provide a substantially V-formation as viewed in Fig. 1.

The disc harrow is particularly adapted for attachment to a vehicle such as a tractor, and hence a coupling generally indicated at 22 in Figs. 1 and 2 is provided on front frame 12. The coupling 22 includes a drawbar 23 attached and arranged parallel to front margin 13 of frame 12 by a pair of spaced brackets 24 (Fig. 1). Strap elements 25 are connected to opposite ends of drawbar 23, and are extended upwardly and inwardly, the upper ends of strap elements 25 being secured by pivot pin 26. A pair of connecting straps 27 are secured to opposite ends of drawbar 23, and are extended forwardly for connection to a tractor. Another connecting strap 30 is connected to pivot pin 26, and is similarly extended forwardly for connection to the tractor. A bracket member 31 is secured to braces 16 located medially of front frame 12, and is pivotally connected to a connecting rod 32, the rod 32 being extended upwardly and connected between strap elements 25 by pivot pin 33 (Fig. 2).

Each of the auxiliary gang sections 11 is identically constructed, and hence a complete description of one will serve as an adequate disclosure for the other, the corresponding parts being identified with the same numerals.

The auxiliary gang section 11 consists of a frame referred to at 34 that is hereinafter designated as the rear frame since it is normally disposed at the rear of front frame 12 of main gang section 10. The rear frame 34 includes a front angle strip 35 that constitutes a front margin, and rearwardly extending braces 36. It will be noted that the innermost brace 36 is considerably shorter in length than the outermost brace 36, the outermost brace constituting the side or lateral margin of rear frame 34. Secured on top of braces 36 is a channel member 37 that is angularly related to the front margin 35 of rear frame 34. A disc gang, referred to generally at 40, is dependingly carried on channel members 37 by vertical strap elements 41.

It will be noted that each disc gang 40 of each auxiliary section 11 is oppositely related, the disc gangs 40 being extended outwardly and rearwardly from the inner portion of each rear frame 34 to a location beyond the side margins 36.

Each of the disc gangs 20 and 40 provide a plurality of individual disc elements 42 (Fig. 2), each disc element 42 being of a circular, concave dish-shaped formation. The disc elements 42 shown in the drawings are disclosed as having uninterrupted cutting edges, but it will be readily appreciated that such peripheral edges of disc elements 42 may be scalloped or serrated to provide a row of separate blades. In the particular arrangement of disc gangs 20 and 40 shown in Figs. 1 and 2, the gangs 20 will operate to throw the earth laterally outward, while gangs 40 will operatively function to throw the earth inwardly. Of course, the disc elements 42 of gangs 40 are arranged in slightly offset relation with the disc elements 42 of gangs 20 to provide a predetermined pattern that realizes an effective and efficient harrow.

The rear frame 34 is operatively secured to front frame 12 by a hinge and a pivot connection referred to generally at 43 (Figs. 1, 7, 8 and 9), such connections being more clearly shown as to structure in Figs. 7, 8 and 9. The hinge connection 43 (Figs. 7, 8, and 9) includes a hinge element 44 carried by the rear margin 15 of front frame 12. The hinge element 44 includes spaced upper and lower walls 45 (Fig. 7), a side wall 46 that constitutes an abutment the function of which will be later described, and a front wall 47 that normally is located contiguous with rear margin 15.

Secured to the innermost end of front margin 35 of rear frame 34 is a coacting hinge element 50, the hinge element 50 having bifurcated arm portions that are disposed internally of hinge element 44. A pivot pin 51 is extended transversely through hinge elements 44 and 50, the pin 51 connecting upper and lower walls 45 with the adjacent arm portions of hinge 50. A pivot pin 52 is extended through the rear margin 15 of front frame 12, and through front wall 47 of hinge element 44. Threadedly received on one end of pivot pin 52 is a nut 53 that is adapted to retain hinge element 44 in position with front wall 47 flush against rear margin 15. However, it will be noted that the other end of pivot pin 52 is connected with front wall 47 so as to permit free rotation of hinge element 44 about an axis defined by pin 52.

When the rear frame 34 is disposed in coplanar relation with front frame 12, as is shown in Figs. 1 and 2, it will be apparent that rear frame 34 can be angularly adjusted with respect to front frame 12 about pivot pin 51. Thus, the angular relation of the disc gang 40 carried by frame 34 may be conveniently adjusted. An adjustable connecting strip 54 (Figs. 1 and 2) bridges each rear frame 34 and the front frame 12, and retains rear frames 34 in adjusted angular position. The connecting strip 54 is secured to the side margin 14 of front frame 12 by a pair of bolts 55. The other end of connecting strip 54 is attached to the outer brace or side margin 36 of rear frame 34 by another pair of bolts 56. To permit angular adjustment of rear frame 34, the connecting strip 54 is provided with slotted apertures 57 (Fig. 2) which are adapted to receive connecting bolts 56.

Figure 3:
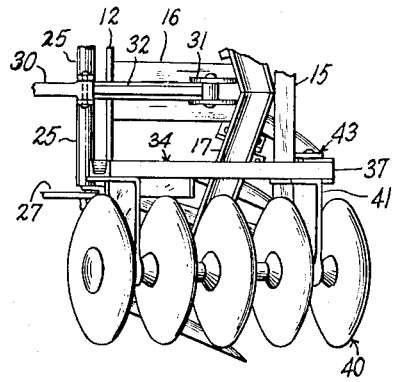
Fig. 3 is a fragmentary top plan view of the device of Fig. 1, showing an auxiliary gang section in a folded, overlying relation with the main gang section.
Figure 4:
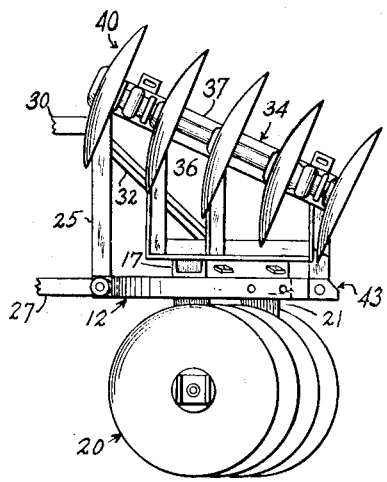
Fig. 4 is a side elevational view of the harrow as shown in Fig. 3.

It is thought that the manner of use and operation of the sectionalized disc harrow has become fully apparent from the foregoing detailed description of structure, but for completeness of disclosure it will be noted that the auxiliary sections 11 may be used in either the extended tandem position of Figs. 1 and 2, or in the folded overlying position of Figs. 3 and 4, depending entirely upon the particular type of use for which the harrow is utilized.

During normal operation, the auxiliary gang sections 11 are used in the tandem position, the rear frames 34 being in coplanar relation with front frame 12. The rear frames 34 may be angularly adjusted with respect to front frame 12 about pivot pin 51, and secured in position by connecting strips 54. Even though rear frames 34 may not be secured by connecting strips 54, it will be noted that rear frames 34 and attached disc gangs 40 cannot be moved bodily upwardly with respect to front frame 12 since neither pivot pin 52 nor pin 51 will permit such movement.

When the implement is to be used for heavy plowing or for clearing rough fields, it is necessary to have the disc gangs penetrate the earth to a greater extent than is possible with the sections 10 and 11 located in coplanar relation. For this purpose, the auxiliary gang sections 11 are moved to a folded overlying position on front frame 12 so as to direct the entire weight of the harrow on disc gangs 20. In order to move the auxiliary sections 11 to the folded, overlying position, the rear frames 34 are released from connecting strips 54 by the removal of bolts 56. The rear frames 34 and connected disc gangs 40 may then be easily lifted by raising their outer ends to cause them to swing upwardly about the axles of their pivot pins 52, the rear frames moving from the coplanar relationship shown in Fig. 1 to the intermediate position shown in Figs. 5 and 6. In Figs. 5 and 6, it is clear that rear frames 34 are disposed in substantially right angular relation to front frame 12, and in a vertical plane. The bifurcated arm portions of each hinge element 50 engage the wall 46 of the coacting hinge element 44 which constitutes an abutment, and thus rear frames 34 and attached disc gangs 40 are retained in the intermediate position off of the ground.

After the auxiliary sections 11 have been raised to the intermediate position shown in Figs. 5 and 6, the auxiliary sections may then be rocked to the folded, overlying position on main section 10. In moving the auxiliary sections 11 to the folded position of Figs. 3 and 4, the rear frames 34 are moved in a substantially vertical plane about pivot pin 51 until front margins 35 seat upon channel members 17. As is shown in Figs. 3 and 4, the entire weight of rear frames 34 and disc gangs 40 is placed on channel members 17, and hence is directed to the subjacent disc gangs 20 of front frame 12.

To lower the auxiliary gang sections 11 to the normal coplanar relation of Figs. 1 and 2, the rear frames 34 are rocked upwardly to the intermediate position of Figs. 5 and 6, and subsequently swung about pivot pin 52 to the tandem position of Fig. 1. The rear frames 34 can then be angularly adjusted with respect to front frame 12 while in coplanar relation therewith, and secured in the adjusted position by connecting strips 54.

Although the invention has been described by making detailed reference to a single presently preferred embodiment, such detail is to be understood in an instructive, rather than in any restrictive sense, many variants being possible within the scope of the claims hereunto appended.

I claim as my invention:

1. In an agricultural implement, a front frame, a rear frame normally disposed in coplanar relation with said front frame, a gang of discs carried by each of said frames, the front frame having a rear margin, a hinge element connected to said rear margin, the rear frame having a front margin, a coacting hinge element connected to said front margin, a pivot pin connecting one of said hinge elements to the adjacent said margin, said pin being disposed in a horizontal plane, and extending transversely of the adjacent said margin, the rear frame being adapted to be raised by one end about said pivot pin from coplanar relation to substantially right angular relation with said front frame, and a second pivot pin connecting said hinge elements, the second pivot pin being disposed in a vertical plane when said frames are in normal coplanar relation, the rear frame being adapted to be rocked by one end about the said second pivot pin to a position overlying the front frame only after displacing said rear frame to said right angular relation.

2. In a sectionalized disc harrow, a front frame, a rear frame normally disposed in coplanar relation with said front frame, a gang of discs carried by each of said frames, the rear frame having a front margin, a hinge element carried by said front margin, the front frame having a rear margin, a coacting hinge element carried on said rear margin, a pivot pin connecting said hinge elements, said pin being disposed in a vertical plane when said frames are in normal coplanar relation, another pivot pin connecting the second said hinge element to said rear margin, the second said pivot pin being disposed in a horizontal plane, and extending transversely of said rear margin so as to permit swinging movement of the rear frame from the horizontal plane to a raised intermediate position in a substantially vertical plane, the first said pivot pin permitting subsequent swinging movement of the rear frame in the vertical plane to a position that overlies said front frame, the pins preventing the rear frame from being raised bodily upwardly out of coplanar relation and moved directly over on the front frame.

3. In a cultivating apparatus, a front frame, a rear frame normally disposed in coplanar relation with said front frame, a gang of discs dependingly carried by each of said frames, the front frame having a rear margin, the rear frame having a front margin, a hinge element carried by said rear margin, a coacting hinge element carried near one end of said front margin, a pivot pin connecting said hinge elements, said pin being disposed vertically when said frames are in normal coplanar relation, said pivot pin enabling angular adjustment of the rear frame relative to the front frame while in coplanar relation, another pivot pin connecting one of said hinge elements and the adjacent frame margin, the second said pivot pin being disposed horizontally and extending transversely of said adjacent frame margin, the second said pin permitting the rear frame to be raised by one end out of coplanar relation with said front frame, the first said pivot means enabling the rear frame to be rocked to an overlying position on said front frame only after movement of said rear frame about the first said pivot pin.

4. In a cultivating implement, a front frame, a rear frame normally disposed in coplanar relation with said front frame, a gang of discs dependingly carried by each of said frames, the front frame having a rear margin, a hinge element carried by said rear margin, the rear frame having a front margin, a coacting hinge element carried near the inner end of said front margin, a pivot pin connecting one of said hinge elements to the adjacent frame margin, said pin being disposed horizontally and extending transversely of said adjacent frame margin, the rear frame being adapted to be swung about said pin from a coplanar relation with said front frame to a substantially right angular relation, another pivot pin connecting said hinge elements, the second said pivot pin being disposed vertically when said frames are in normal coplanar relation, said pins preventing the rear frame from being raised bodily upwardly out of coplanar relation and moved directly over on the front frame, one of said hinge elements having an abutment located at one side of the second said pivot pin that engages the other hinge element to retain the rear frame in the right angular position, the second said pivot pin being adapted to permit the rear frame to be rocked in a plane from the angular position to a position that overlies the front frame.

5. In a cultivating disc harrow, a front frame, a rear frame normally disposed in coplanar relation with said front frame, a gang of discs dependingly carried by each of said frames, the front frame structure having a rear margin and a side margin, a hinge element carried by said rear margin and considerably spaced from said side margin, the rear frame structure having a front margin and a side margin, a coacting hinge element carried on one end of said front margin, a pivot pin between said hinge elements, said pin being disposed vertically when said frames are in coplanar relation, said pin being adapted to permit angular adjustment of said rear frame relative to said front frame while in coplanar relation, an adjustable connection between the side margins of said frames adapted to fix the angular position of said rear frame, a second pivot pin between the first said hinge element and said rear margin, the second said pin being disposed horizontally and extending transversely of said rear margin, the pins preventing the rear frame from being raised bodily upwardly out of coplanar relation and moved directly over the front frame, the rear frame being adapted to be raised by one end about said second pivot pin from a coplanar relation with the front frame to an intermediate position substantially right angularly related to said front frame, an abutment on one of said hinge elements located at one side of the second said pin, and adapted to engage the other hinge element to retain the rear frame and connected discs in the last said raised position off of the ground, the rear frame being adapted to be subsequently rocked by one end about the first said pivot connection from the last said raised intermediate position to a position overlying the front frame.

6. In an agricultural implement, a front frame, a plurality of rear frames normally disposed in coplanar relation with said front frame, a gang of discs dependingly carried by each of said frames, the front frame having a rear margin, the rear frames having front margins, a hinge element carried on the inner end of each of said front margins, a coacting hinge element carried on the rear margin opposite to and adjacent each of the first said hinge elements, a pivot pin between each of the said adjacent hinge elements, said pivot pin being disposed vertically when said frames are in normal coplanar relation, a second pivot pin between one of said margins and each hinge element carried by said margin, the second said pin being disposed horizontally and extending transversely of the last said margin, said pins preventing the rear frames from being raised bodily upwardly out of coplanar relation and moved directly over on the front frame, each of said rear frames being adapted to be raised by its outer end about an axis defined by said second pivot pin out of coplanar relation with the front frame and into a raised intermediate position substantially in right angular relation with the front frame, each of said rear frames being adapted to be rocked subsequently about an axis defined by said first pivot pin from the raised intermediate position to a superimposed position whereby the rear frames and attached disc gangs overlie the front frame.

7. The combination and arrangement of elements as recited in claim 6, but further characterized in that the first said pivot connection is adapted to permit angular coplanar adjustment of each of said rear frames relative to said front frame, and in the provision of an adjustable connection between each of said rear frames and said front frame adapted to retain said rear frames in adjusted angular, coplanar relation.

References Cited in the file of this patent

UNITED STATES PATENTS

| | | |
|---|---|---|
| 2,098,116 | Warne | Nov. 2, 1937 |
| 2,609,647 | Love | Sept. 9, 1952 |
| 2,640,307 | Robertson | June 2, 1953 |